UNITED STATES PATENT OFFICE.

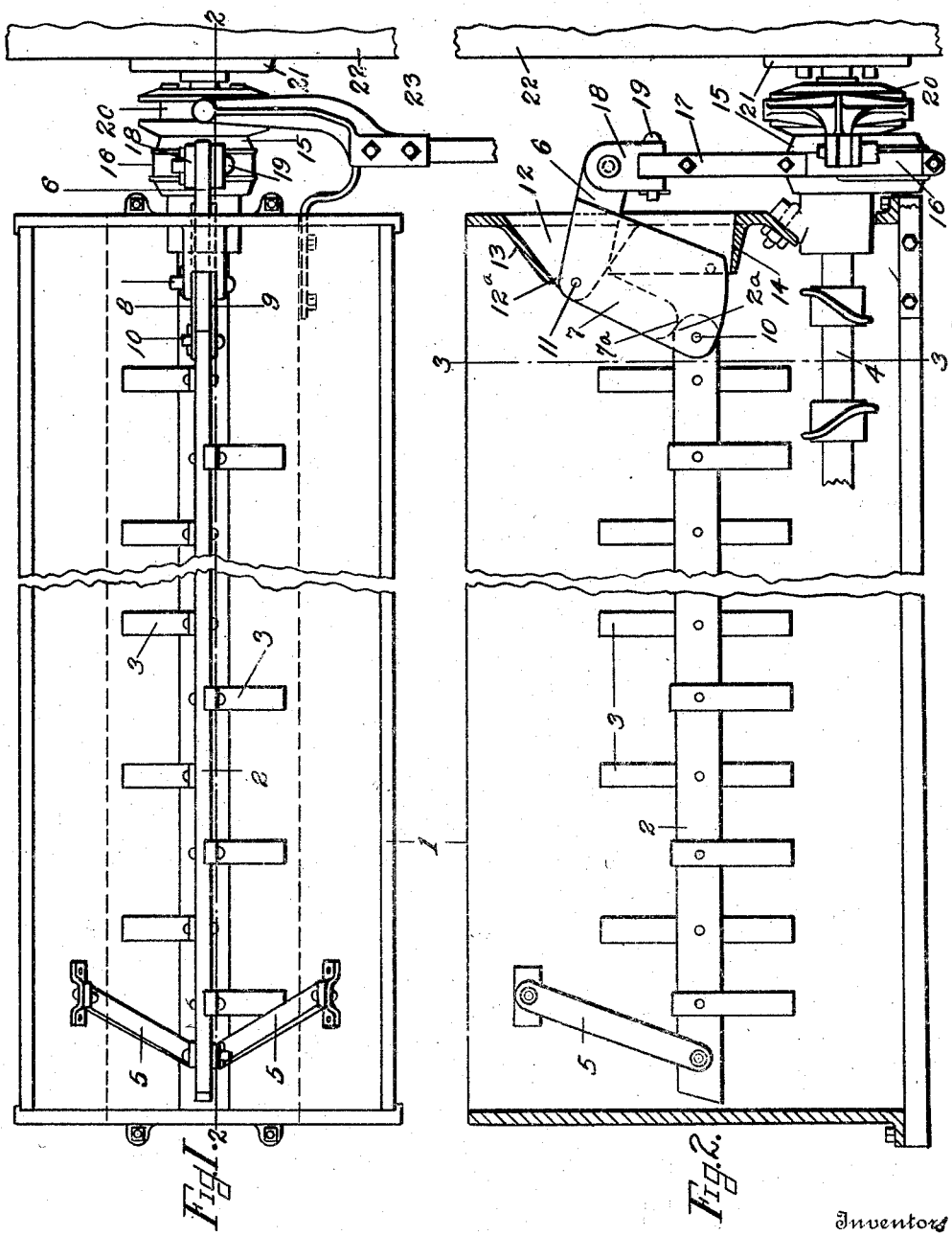

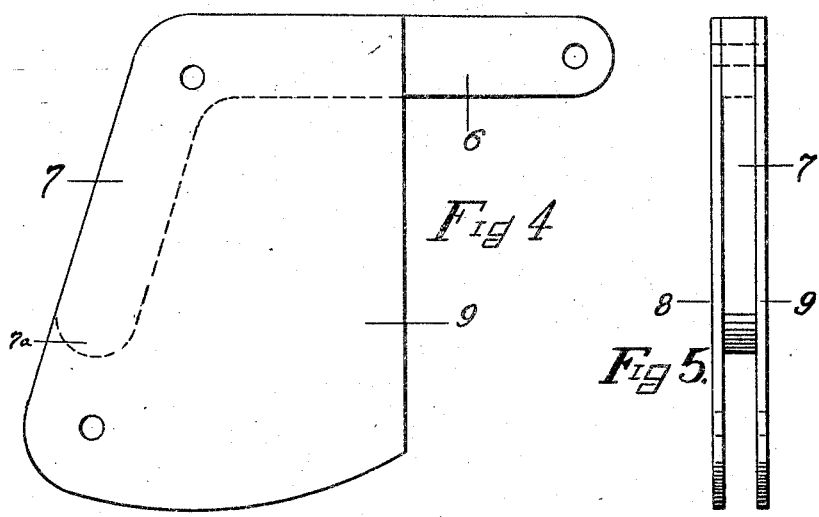
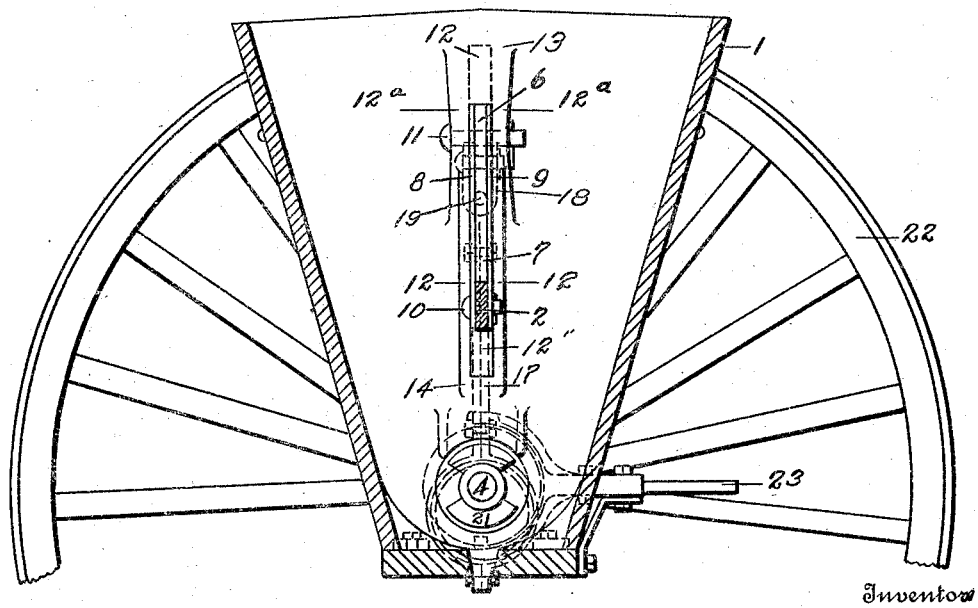

HENRY N. FAAS AND WILLIAM L. BRALEY, OF SPRINGFIELD, OHIO, ASSIGNORS TO THE AMERICAN SEEDING MACHINE COMPANY, OF SPRINGFIELD, OHIO, A CORPORATION OF OHIO.

FEED-REGULATOR FOR FERTILIZER-SOWERS.

1,276,047.                  Specification of Letters Patent.      Patented Aug. 20, 1918.

Application filed November 8, 1915.   Serial No. 60,294.

*To all whom it may concern:*

Be it known that we, HENRY N. FAAS and WILLIAM L. BRALEY, citizens of the United States, residing at Springfield, in the county of Clark and State of Ohio, have invented certain new and useful Improvements in Feed-Regulators for Fertilizer-Sowers, of which the following is a specification.

This invention relates to improvements in agitating devices for sowing machines, and more particularly to agitators for machines for sowing such fertilizer as lime.

The object of the invention is to provide an arrangement for preventing the fertilizer from accumulating in the opening in the hopper end through which the operating devices for the agitator extend.

In the accompanying drawings:—

Figure 1 is a top plan view of a hopper of a lime sower with the cover removed showing my improved devices applied thereto.

Fig. 2 is a longitudinal section, the section being on the line 2—2 of Fig. 1.

Fig. 3 is a vertical section, the section being on the line 3—3 of Fig. 2.

Fig. 4 is a side elevation of one of the parts of the agitator operating devices.

Fig. 5 is an end view of the same.

In the said drawings, 1 represents the hopper within which the fertilizer or other material to be sown is placed. The agitator employed is one which reciprocates longitudinally of the hopper, being centrally arranged therein, and consists of a bar 2 provided with a series of downwardly and outwardly projecting fingers 3; this agitator being arranged above the feed shaft 4 in the customary manner. One end of the agitator bar 2 is pivotally supported by the links or arms 5 and the other end is pivotally supported from one arm of a bell crank lever of peculiar construction, the other arm of said lever being extended through the end of the hopper and connected with the operating devices for the agitator.

Referring more particularly to Figs. 4 and 5, this bell crank lever consists of arms 6 and 7 to which are connected plates 8 and 9. A portion of the edges of the respective plates stand flush with the outer edges of the arms 6 and 7 but the plates are extended beyond the arm 7 so as to form in effect a continuation of said arm and are pivotally connected as at 10 with the agitator bar 2; the end of the arm 7 being rounded as indicated at 7a and extending in close proximity to the rounded end 2a of the bar 2 so as to close the space between the plates 8 and 9. The bell crank lever thus formed is pivoted by the pin 11 to ears 12a which project inwardly from the walls 12 of a slotted opening formed in the end of the hopper. These walls 12 extend for a substantial distance into the hopper and a downwardly inclined cover 13 and bottom 14 close the space at the top and bottom of said walls so as to constitute an open ended housing; the walls 12 and top and bottom portions being all preferably integrally formed from a single casting secured about an opening in the end of the hopper.

The bell crank lever, or rather that part thereof formed by the arm 7 and plates 8 and 9 is of such width as to fit snugly between the walls of the housing which together with the fact that the plates 8 and 9 lie well within the opening in all the positions of the bell crank lever, provides for keeping the opening at all times closed against the entrance therein of the material in the hopper.

The bell crank lever is operated from an eccentric 15 through the medium of the strap 16, link 17, and link 18; the link 18 being pivotally connected to the arm 6 of the bell crank lever and also pivotally connected to the link 17 by the pin 19, the pivots being arranged at right-angles to each other so as to permit the necessary movement of the parts. The eccentric 15 is rotatably connected with one member 20 of a clutch, the other member 21 of which is on one of the ground wheels 22. The feed shaft 2 is also driven from the same source of power. An operating lever 23 serves to throw the clutch member 20 into and out of engagement with the clutch member 21.

Having thus described our invention, we claim:—

1. In a machine of the character described, a hopper having a slotted opening, a vibratable agitator in said hopper, and vibrating devices for vibrating said agitator, one part of which devices extends through said slotted opening and is pivotally connected to the walls thereof so as to oscillate therein and is also pivotally connected to said agitator, said part being so constructed and arranged as to maintain the opening closed in all of its positions therein.

2. In a machine of the character described, a hopper, one end of said hopper having a vertically extending slotted opening, a vibratable agitator in said hopper, and vibrating devices for vibrating said agitator, one part of which extends through said slotted opening and is pivotally connected to the walls thereof so as to oscillate therein in a direction at right angles to the vertical plane of said hopper end, said part being also pivotally connected to said agitator, said part being so constructed and arranged as to maintain said opening closed in all positions thereof.

3. In a machine of the character described a hopper a vibratable agitator in said hopper said hopper having a slotted opening, a pivoted bell crank lever extending through said opening and having an operative connection with said hopper, and means for oscillating said bell crank lever, the construction and arrangement of said opening and bell crank lever being such as to maintain said opening closed in all the different positions of operation of said bell crank lever.

4. In a machine of the character described, a hopper, a vibratable agitator in said hopper, said hopper having a slotted opening, a pivoted bell crank lever extending through said opening and operatively connected with said agitator, together with means for operating said bell crank lever, and walls on the sides of said bell crank lever fitted snugly to the walls of said opening so as to close said opening in all the different positions of said lever.

5. In a machine of the character described, a hopper having a slotted opening, a vibratable agitator in said hopper, a pivoted bell crank lever extending through said opening and having an operative connection with said agitator together with means for operating said lever, and plates secured to said lever and fitted snugly to the walls of said opening, one arm of said lever extending between said plates, for the purpose specified.

6. In a machine of the character described, a hopper, a vibratable agitator in said hopper, said hopper having a slotted opening, the walls of said opening being extended into said hopper, top and bottom covers for said walls, a bell crank lever pivotally supported between said walls and covers and having an operative connection with said agitator, together with means for operating said lever, and side plates on said lever fitted snugly to the walls of said opening, one arm of said lever being extended between said plates.

7. In a machine of the character described, a hopper having one of its ends provided with a slotted opening, a vibratable agitator in said hopper, and vibrating devices for vibrating said agitator extending through said opening and oscillatory therein in a direction at right angles to the vertical plane of said hopper end, the size of said opening being such that said vibrating devices completely close said opening in all positions of movement thereof.

In testimony whereof, we have hereunto set our hands this 4th day of November, 1915.

HENRY N. FAAS.
WILLIAM L. BRALEY.

Witness:
CHAS. I. WELCH.

Copies of this patent may be obtained for five cents each, by addressing the "Commissioner of Patents, Washington, D. C."